US009481190B2

(12) United States Patent
Ito et al.

(10) Patent No.: US 9,481,190 B2
(45) Date of Patent: Nov. 1, 2016

(54) INFORMATION PROCESSING APPARATUS AND CONTROL METHOD THEREOF

(71) Applicant: CANON KABUSHIKI KAISHA, Tokyo (JP)

(72) Inventors: Koji Ito, Inagi (JP); Mitsuru Konji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/744,730

(22) Filed: Jun. 19, 2015

(65) Prior Publication Data

US 2016/0001581 A1 Jan. 7, 2016

(30) Foreign Application Priority Data

Jul. 1, 2014 (JP) ................................. 2014-136218
Feb. 17, 2015 (JP) ................................. 2015-028861

(51) Int. Cl.
*B41J 29/393* (2006.01)
*B41J 29/13* (2006.01)

(52) U.S. Cl.
CPC ............... *B41J 29/393* (2013.01); *B41J 29/13* (2013.01)

(58) Field of Classification Search
CPC .... B41J 29/393; B41J 11/009; B41J 11/485; G01N 21/00; G01N 21/0137
See application file for complete search history.

(56) References Cited

U.S. PATENT DOCUMENTS

| | | | | |
|---|---|---|---|---|
| 2003/0053816 A1* | 3/2003 | Asai | ............................ | B41J 3/60 399/82 |
| 2006/0062621 A1* | 3/2006 | Saida | ................... | B41J 11/0075 400/76 |
| 2007/0066356 A1* | 3/2007 | Lapstun | ................... | B41J 3/445 455/557 |
| 2012/0056365 A1* | 3/2012 | Kato | ...................... | B41J 11/006 271/9.1 |
| 2013/0148144 A1* | 6/2013 | Tao | ......................... | G06K 15/16 358/1.12 |
| 2013/0229683 A1* | 9/2013 | Nakayama | ........... | G06K 15/402 358/1.15 |

FOREIGN PATENT DOCUMENTS

JP    11-48580    2/1999

* cited by examiner

*Primary Examiner* — Matthew Luu
*Assistant Examiner* — Patrick King
(74) *Attorney, Agent, or Firm* — Fitzpatrick, Cella, Harper & Scinto

(57) ABSTRACT

The present invention provides a technique that simplifies operations for making appropriate print settings. Accordingly, a terminal apparatus serving as an information processing apparatus according to the present invention acquires, from a printing apparatus, information indicating the sheet type and size of the sheets set in each paper feed tray. Then, the terminal apparatus determines whether the acquired information includes a sheet type that matches a sheet type suitable for an attribute of information selected by a user as a print target. If it is determined that the information includes a sheet type that matches the suitable sheet type, the terminal apparatus generates print data including information designating a paper feed tray containing sheets of the matching sheet type, and transmits the generated print data to the printing apparatus.

26 Claims, 12 Drawing Sheets

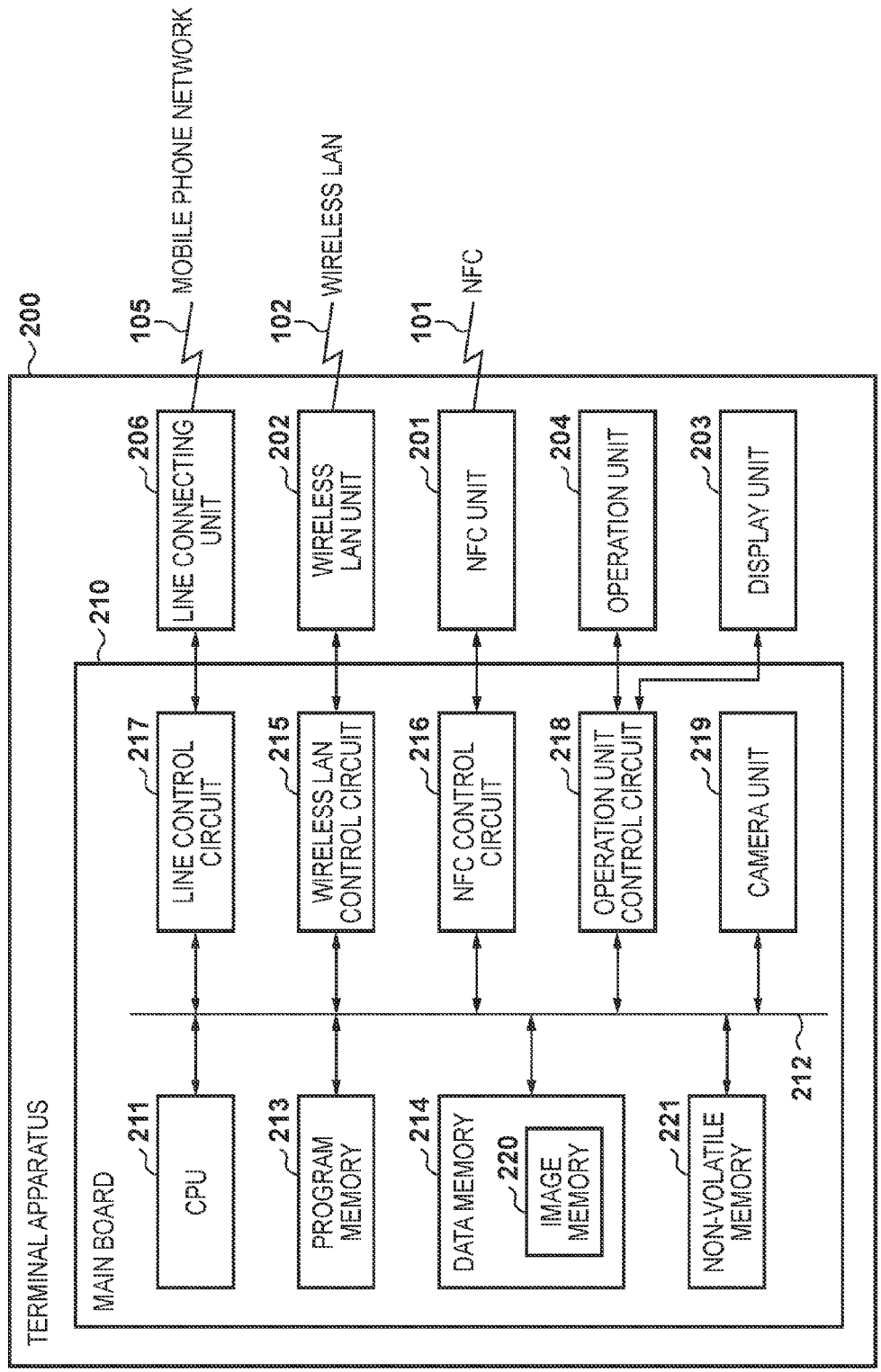

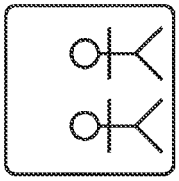

FIG. 13

SHEET SETTINGS

- ○ PLAIN PAPER
- ○ PHOTO PAPER PLUS GLOSSY II
- ○ PHOTO PAPER PLUS SEMI-GLOSS
- ● GLOSSY PHOTO PAPER
- ○ HIGH-RESOLUTION PAPER
- ○ PHOTO PAPER
- ○ ENVELOPE
- ○ HAGAKI

1301

PRINT

FIG. 12

SHEET SETTINGS

- ○ LETTER
- ○ LEGAL
- ○ A5
- ○ A4
- ○ B5
- ○ KG
- ○ 5×7
- ○ 8R
- ● 3R(L)
- ○ 5R(2L)

1201

PRINT

| PAPER FEED TRAY | SHEET TYPE | SHEET SIZE |
|---|---|---|
| PAPER FEED TRAY 1 | PHOTO PAPER PLUS GLOSSY II | 3R(L) |
| PAPER FEED TRAY 2 | PLAIN PAPER | A4 |

| PAPER FEED TRAY | SHEET TYPE | SHEET SIZE |
|---|---|---|
| PAPER FEED TRAY 1 | PLAIN PAPER | 3R(L) |
| PAPER FEED TRAY 2 | PLAIN PAPER | A4 |

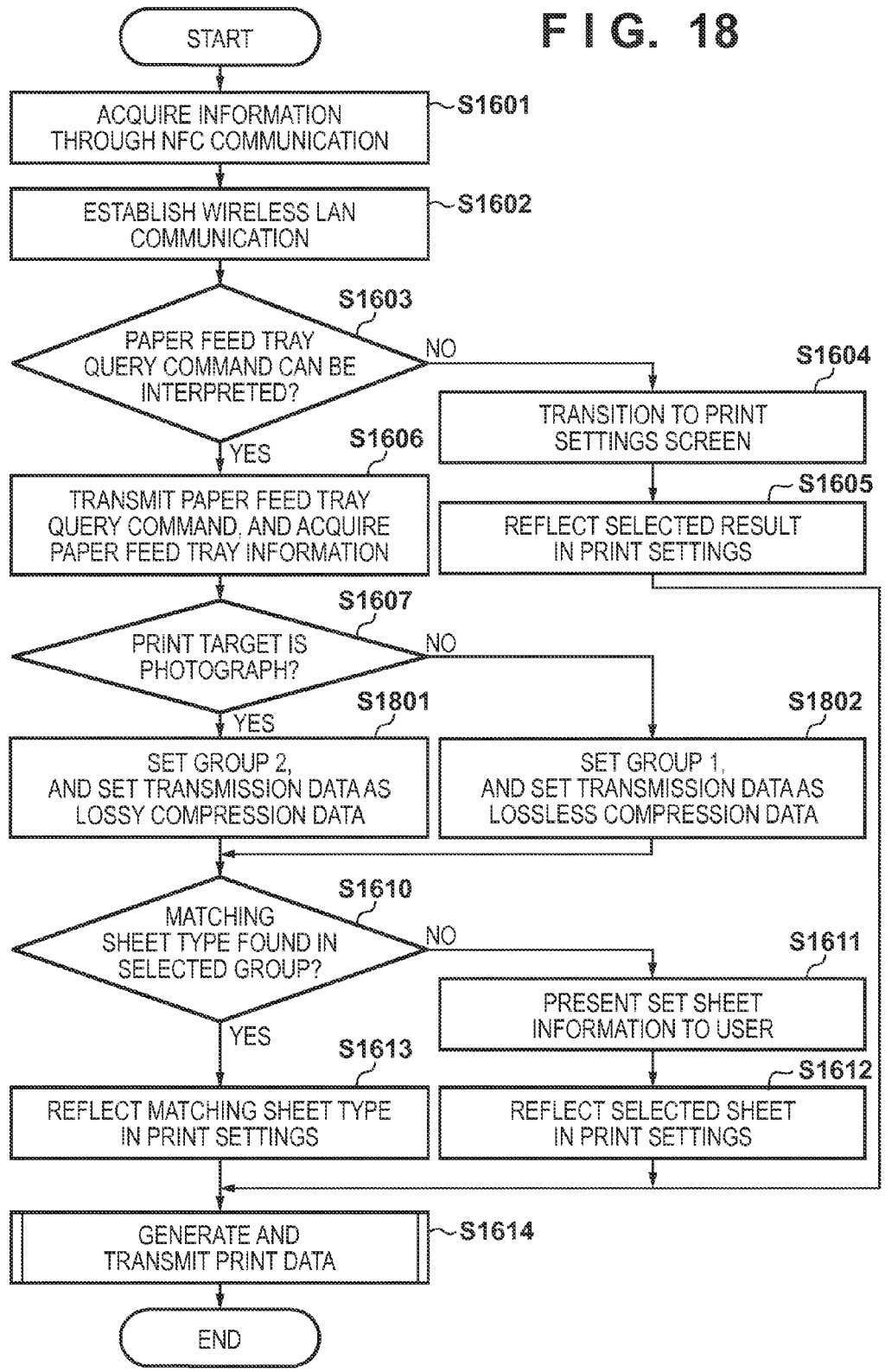

INFORMATION PROCESSING APPARATUS AND CONTROL METHOD THEREOF

BACKGROUND OF THE INVENTION

1. Field of the Invention

The present invention relates to an information processing apparatus and a control method thereof.

2. Description of the Related Art

In recent years, a technique has become available that allows a printer and an external apparatus such as a digital camera or a mobile phone to establish wireless communication, and the printer to receive an image from the external apparatus so as to print the image. With this technique, it is known that the printer and the external apparatus first identify their communication partner through short distance wireless communication such as near field communication (NFC), and after that, the printer receives a print target image file from the external apparatus through another wireless communication that is different from and faster than the short distance wireless communication.

To actually perform printing, a user makes print settings in software that executes printing, and then issues a print execution instruction, whereby the user obtains a desired print output. The print settings include print setting items such as sheet type, sheet size and sheet feeding method. The sheet type includes glossy sheet suitable for printing photographs, standard sheet suitable for printing documents, and the like. Needless to say, it is necessary to make appropriate settings in the setting items. In particular, with inkjet printing, in order to perform image forming processing appropriate for the sheet type, it is necessary to make appropriate settings so as to obtain a favorable print output.

The user is required to make appropriate print settings, but it is troublesome for the user to perform such print setting operations, and thus there is demand for the software to automatically make optimal settings.

In order to reduce the effort required by the user to perform setting operations, a method is proposed in which an appropriate paper feed tray is selected based on sheet attributes (size and type) designated by the user, and a sheet with the designated attributes is used to the highest degree possible even if the sheet with the designated attributes is run out. One example thereof is disclosed in Japanese Patent Laid-Open No. 11-48580.

According to the aforementioned document, however, an appropriate paper feed tray is selected based on the sheet attributes designated by the user. In other words, the user is required to select appropriate sheet attributes from among a large number of sheet types, which imposes significant operational burden on the user and makes operations complicated.

SUMMARY OF THE INVENTION

The present invention has been made in view of the problem described above, and is intended to provide a technique that simplifies operations for making appropriate print settings.

According to an aspect of the present invention, there is a provided an information processing apparatus capable of performing communication with a printing apparatus, the information processing apparatus comprising: an acquisition unit configured to acquire sheet information indicating sheets set in paper feed trays provided in the printing apparatus; a determination unit configured to determine a sheet attribute that is used to perform printing based on an attribute of print target data; and a print data generation unit configured to, if the sheet attribute determined by the determination unit is included in the sheet information acquired by the acquisition unit, generate print data based on the print target data such that printing is performed using a sheet corresponding to the sheet attribute.

According to the present invention, it is possible to simplify operations for making appropriate print settings even more than conventional techniques.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing a configuration of the terminal apparatus.

FIG. 10 is a diagram showing a print settings screen.

FIG. 11 is a diagram showing a sheet settings screen.

FIG. 12 is a diagram showing a list of selectable sheet sizes.

FIG. 13 is a diagram showing a list of selectable sheets.

FIG. 18 is a flowchart illustrating a procedure of processing according to a third embodiment.

DESCRIPTION OF THE EMBODIMENTS

Hereinafter, preferred embodiments of the present invention will be described in detail with reference to the accompanying drawings. It should be noted that the embodiments given below are not intended to limit the invention or the scope of the appended claims, and that not all the combinations of features described in the embodiments are necessarily essential to the solving means of the present invention.

First Embodiment

Overall System Configuration

Figure 1:
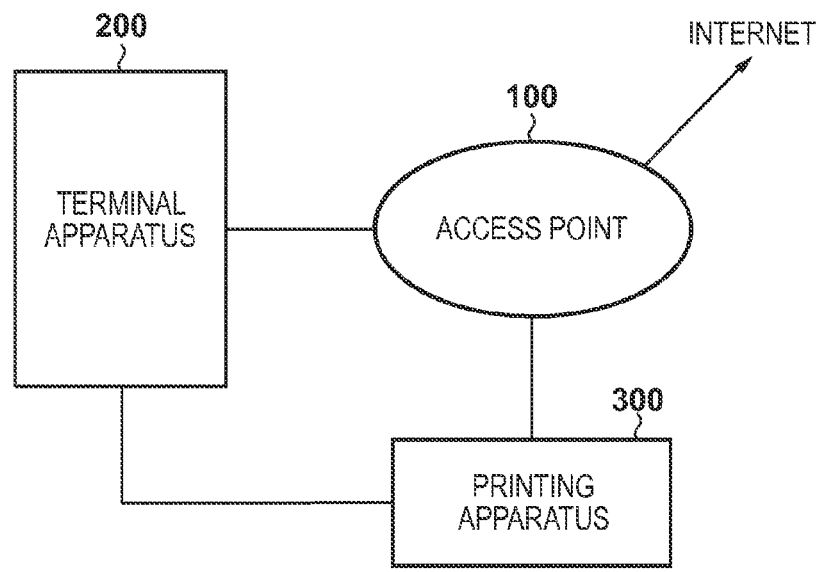
FIG. 1 is a diagram showing a configuration of a printing system according to an embodiment.

FIG. 1 is a diagram showing a configuration of a print processing system. This system includes an access point 100, a terminal apparatus 200 serving as a mobile information processing apparatus that can be connected to the access point 100, and a printing apparatus 300. The terminal apparatus 200 that also functions as a communication apparatus includes at least two wireless communication units having different communication speeds (or communicable ranges). The terminal apparatus 200 can be any type of apparatus as long as it is an apparatus that can handle files that will be print targets such as a personal digital assistant (PDA), a mobile phone (including a smart phone), or a digital camera. The printing apparatus 300 which also functions as a communication apparatus includes a reading function of reading an original placed on a platen and a print function of performing printing using a printing engine such as an inkjet printer, and may further include a fax function and a telephone function.

The access point 100 and the printing apparatus 300 can be connected by a wireless LAN, but may be connected by a wired LAN. The access point 100 and the terminal apparatus 200 can also be connected by a wireless LAN. The terminal apparatus 200 and the printing apparatus 300 are capable of performing communication through short distance wireless communication. The printing apparatus 300 has an AP mode, and when the AP mode is enabled, the terminal apparatus 200 and the printing apparatus 300 can also perform peer-to-peer communication by a wireless LAN. When the AP mode is enabled, the terminal apparatus 200 and the printing apparatus 300 perform peer-to-peer communication by using an access point provided in the printing apparatus 300. The printing apparatus 300 may perform communication with the access point 100 while peer-to-peer communication is established between the terminal apparatus 200 and the printing apparatus 300 via the access point of the printing apparatus 300. Whether the printing apparatus enables only the AP mode or both the AP mode communication and the communication with the access point 100 is determined based on an instruction from the user.

External View of Terminal Apparatus

Figure 2:
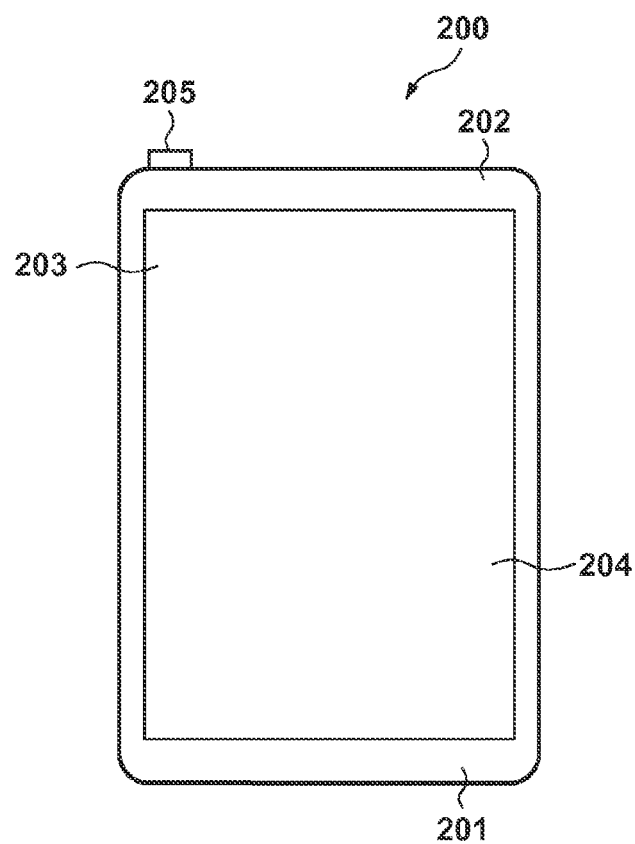
FIG. 2 is a diagram showing an external view of a terminal apparatus.

FIG. 2 is a diagram showing an external view of the terminal apparatus 200. In the present embodiment, a smart phone is used as an example of the terminal apparatus. As used herein, "smart phone" refers to a multifunctional mobile phone including, in addition to a mobile phone function, a camera function, an internet browser function and an email function. An NFC (near field communication) unit 201 is a unit configured to perform short distance wireless communication. Communication can be established by actually bringing the NFC unit 201 within a predetermined distance (about 10 cm) from an NFC unit provided in the communication partner (in the present embodiment, an NFC unit provided in the printing apparatus 300).

A wireless LAN unit 202 is a unit configured to perform wireless LAN communication. The wireless LAN unit 202 is capable of performing higher speed communication than the NFC unit, and is disposed within the terminal apparatus 200. A display unit 203 is a display including, for example, an LCD display mechanism. An operation unit 204 includes a touch panel type operation mechanism, and is configured to detect press information regarding a pressing operation performed by the user. A typical operation method is performed such that button icons and a software keyboard are displayed by the display unit 203, and when the user presses the operation unit 204, an event indicating that a button has been pressed is issued. A power key 205 is used to turn power on or off.

External View of Printing Apparatus

Figure 3A:
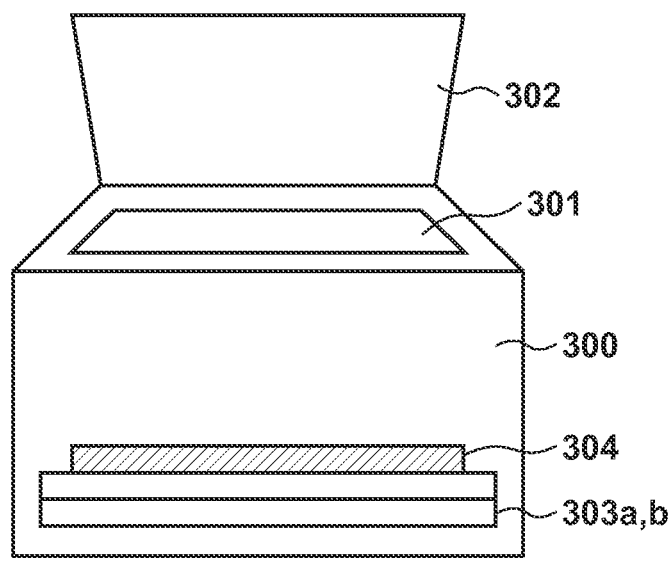
FIGS. 3A and 3B are diagrams showing external views of a printing apparatus.
Figure 3B:
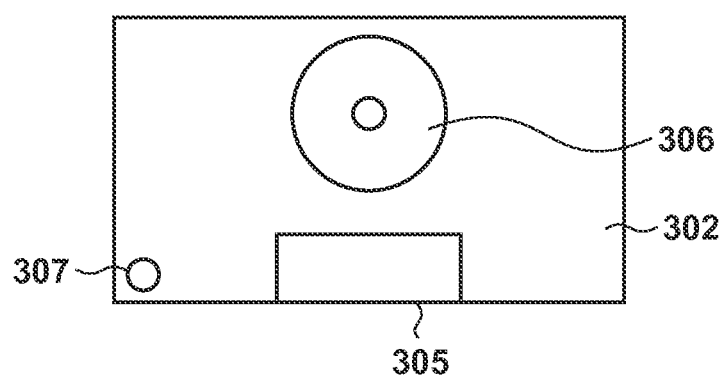

FIG. 3A is a diagram showing an external view of the printing apparatus 300 including a plurality of paper feed trays, and FIG. 3B is a top view of the same. In the present embodiment, a multi function printer (MFP) having a reading (scanner) function is used as an example of the printing apparatus. In FIG. 3A, a platen 301 is a transparent glass table, which is used to place an original thereon so that the original is read with a scanner. An original cover 302 is a cover for preventing leakage of reading light to the outside during reading with a scanner. Print paper feed trays 303a and 303b are paper feed trays in which sheets of various types of sizes are set. The present embodiment will be described using an example in which two paper feed trays 303 are provided, but there is no limitation on the number of paper feed trays, and three or more paper feed trays may be provided. The sheets set in the print paper feed tray 303a or 303b are conveyed one by one to a printing unit so as to be printed, and then discharged from a printed sheet discharge tray 304. The sheet size and the sheet type of the sheets set in the print paper feed trays 303a and 303b can be registered in the printing apparatus 300 as sheet information. A method for registering sheet information will be described later.

As shown in FIG. 3B, on the original cover 302, an operation display unit 305 and an NFC unit 306 are disposed. The NFC unit 306 is a unit configured to perform short distance wireless communication, and it is the location where the terminal apparatus 200 is actually brought closer so as to come into proximity with the printing apparatus 300. The effective distance for establishing a connection is set to a predetermined distance (about 10 cm) from the NFC unit 306. A wireless LAN antenna 307 is an antenna for wireless LAN communication, which is embedded in the original cover.

As used herein, "short distance wireless communication" means wireless communication in a relatively short communication range (for example, 1 meter to several centimeters), as typified by NFC.

Configuration of Terminal Apparatus

FIG. 4 is a block diagram showing a configuration of the terminal apparatus. The terminal apparatus 200 includes a main board 210 that performs overall control on the apparatus, the wireless LAN unit 202, the NFC unit 201, a line connecting unit 206, the operation unit 204 and the display unit 203. Here, the wireless LAN unit 202, the NFC unit 201 and the line connecting unit 206 function as a communication unit of the terminal apparatus 200.

A CPU 211 in the form of a microprocessor disposed on the main board 210 performs operations in accordance with a control program stored in a program memory 213 in the form of a ROM connected via an internal bus 212 and the content of a data memory 214 in the form of a RAM.

The CPU 211 performs communication with another communication terminal apparatus via a wireless LAN 102 by controlling the wireless LAN unit 202 via a wireless LAN control circuit 215. The CPU 211 can detect a connection with another NFC terminal via NFC 101 or perform data transmission and reception with another NFC terminal by controlling the NFC unit 201 via an NFC control circuit 216. The CPU 211 can connect to a mobile phone network 105 and perform a telephone conversation and data transmission and reception by controlling the line connecting unit 206 via a line control circuit 217.

The CPU 211 can receive instructions from the user via the operation unit 204 and display various types of menus, images and the like on the display unit 203 by controlling an operation unit control circuit 218. The CPU 211 can capture images by controlling a camera unit 219, and store captured images in an image memory 220 provided in the data memory 214. The CPU 211 can also store, in addition to captured images, images acquired from the outside via the mobile phone network 105, the wireless LAN 102 or the NFC 101 in the image memory 220, and transmit images to the outside.

A non-volatile memory 221 is composed of a memory such as a flash memory, and is configured to store data that needs to be saved even after power is turned off. Examples of the data stored in the non-volatile memory 221 include telephone book data, various types of communication connection information, device information regarding devices with which connections were made in the past, image data that needs to be saved, and programs such as application software that causes the terminal apparatus 200 to implement various types of functions.

Configuration of Printing Apparatus

Figure 5:
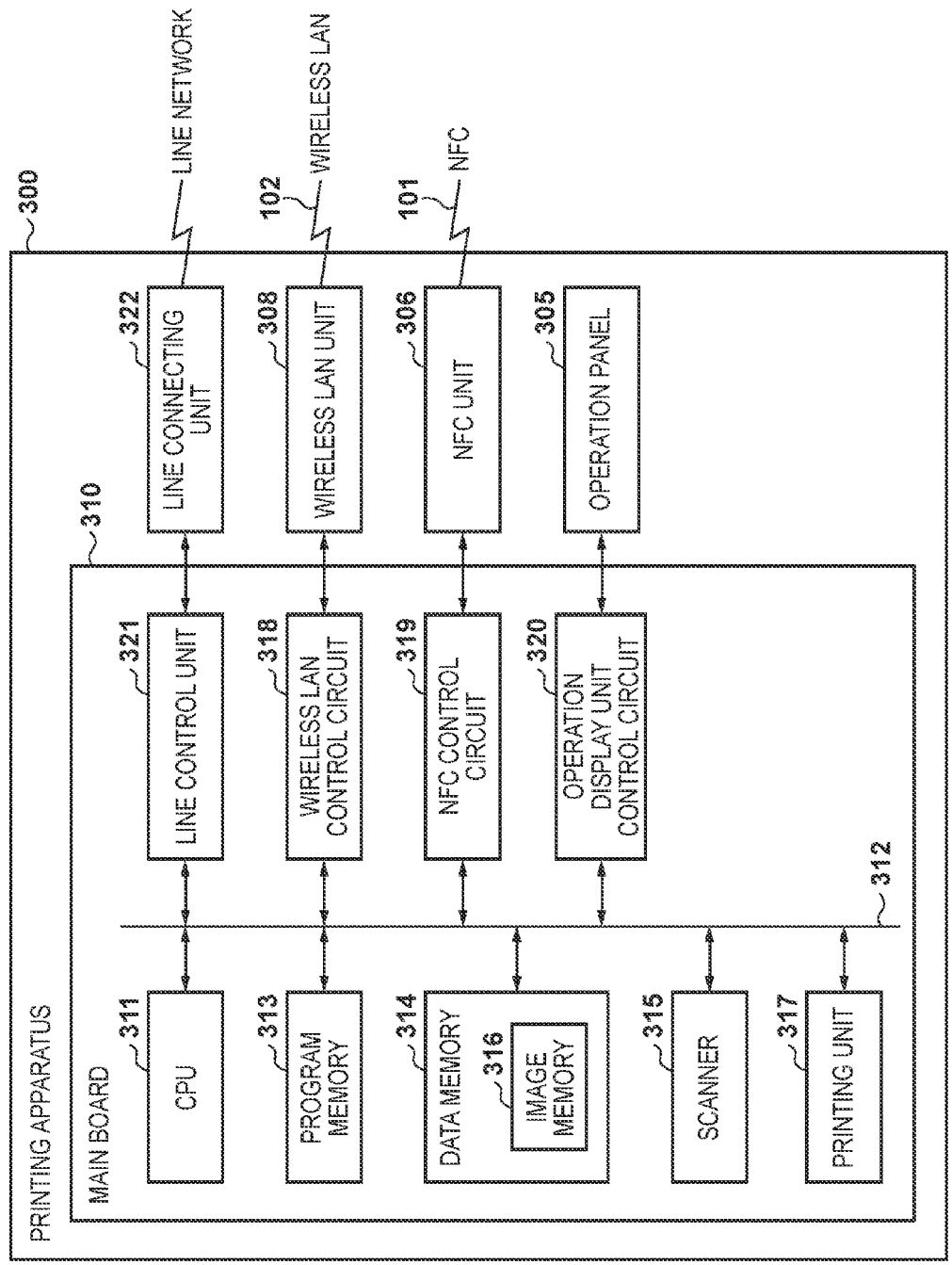
FIG. 5 is a block diagram showing a configuration of the printing apparatus.

FIG. 5 is a block diagram showing a configuration of the printing apparatus. The printing apparatus 300 includes a main board 310 that performs overall control on the apparatus, a line connecting unit 322, a wireless LAN unit 308, the NFC unit 306 and an operation panel 305. Here, the line connecting unit 322, the wireless LAN unit 308 and the NFC unit 306 function as a communication unit of the printing apparatus 300.

A CPU 311 in the form of a microprocessor disposed on the main board 310 executes processing in accordance with a control program stored in a program memory 313 in the form of a ROM connected via an internal bus 312 and the content of a data memory 314 in the form of a RAM.

The CPU 311 reads an original by controlling a scanner unit 315, and stores the read original in an image memory 316 provided in the data memory 314. The CPU 311 can also print images stored in the image memory 316 provided in the data memory 314 onto a recording medium by controlling a printing unit 317.

The CPU 311 can perform printing of print data received from the outside via a line control unit 321. The CPU 311 can print data in the form of a vendor-specific print command, lossy compression data specified by a standard specification such as JPEG, lossless compression data such as PWG Raster or Tiff, and the like.

The CPU 311 performs communication with another communication terminal apparatus via the wireless LAN 102 by controlling the wireless LAN unit 308 via a wireless LAN control circuit 318. Also, the CPU 311 can detect a connection with another NFC terminal via the NFC 101 or perform data transmission and reception with another NFC terminal by controlling the NFC unit 306 via an NFC control circuit 319. The CPU 311 can connect to a telephone network 323 and perform fax transmission and reception and data transmission and reception by controlling the line connecting unit 322 via a line control circuit 321.

The CPU 311 can display, on the operation panel 305, the state of the printing apparatus 300 and a function selection menu by controlling an operation display unit control circuit 320, and accept operations from the user. Accordingly, the operation panel 305 is composed of a touch panel display having various types of switches and buttons.

It is assumed that the following information is stored in an unshown memory (non-volatile memory) provided in the NFC unit 306:

(1) information indicating that the printing apparatus has a responding function of providing sheet information (the material and the size of sheets) regarding the sheets set in the paper feed trays in response to a query request from the outside; and (2) parameters (SSID, encryption scheme, encryption key and the like) for performing higher speed wireless LAN communication than NFC communication.

In other words, the device having an NFC communication function (the terminal apparatus 200 of the present embodiment) can acquire the above information (1) and (2) through NFC communication with the printing apparatus 300. The information (1) is for discriminating whether or not, for example, the printing apparatus 300 is capable of responding to the query request, and thus it is possible to instead use the model name or model number of the printing apparatus. The terminal apparatus 200 can access a database provided in the terminal apparatus or an external database based on the model name, and determine whether or not the printing apparatus has the responding function.

Sheet Information Registration Screen

Figure 6:
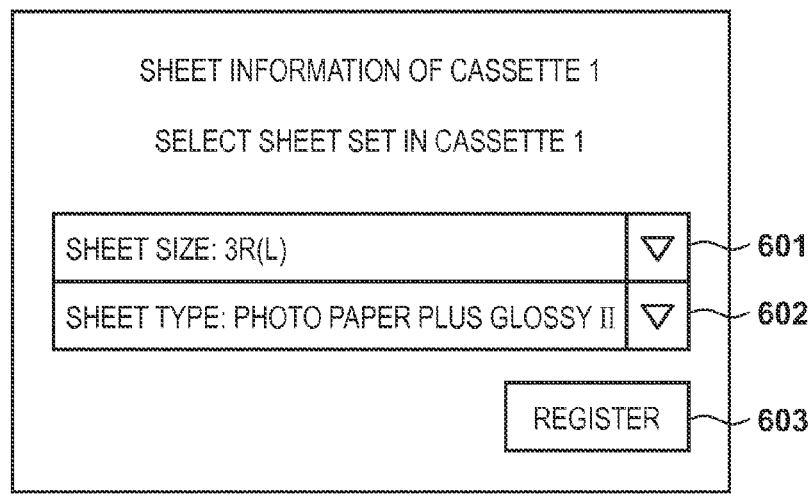
FIG. 6 is a diagram showing a sheet information registration screen.

FIG. 6 shows a sheet information registration screen displayed on the operation panel 305 of the printing apparatus 300. The screen is automatically displayed on a display screen in response to the user setting sheets in one (303*a* or 303*b*) of the print paper feed trays. However, the sheet information registration screen may be displayed through an operation of selecting a sheet setting item from an initial menu. As shown in the diagram, the sheet information registration screen includes two items with respect to one paper feed tray, the two items being respectively displayed in a sheet size display area 601 and a sheet type display area 602. These items are displayed in the form of combo boxes, and as a result of the user selecting one entry from each combo box, the sheet size and the sheet type of the sheets set by the user can be set. Then, in response to the user pressing (touching) a registration button 603, the information can be registered.

The printing apparatus 300 according to the present embodiment includes two paper feed trays 303*a* and 303*b*. Accordingly, the above registration operation is performed for each paper feed tray. The CPU 311 of the printing apparatus 300 stores the registered information in the data memory 314 (desirably a non-volatile memory).

Application Software Screen

Figure 7:
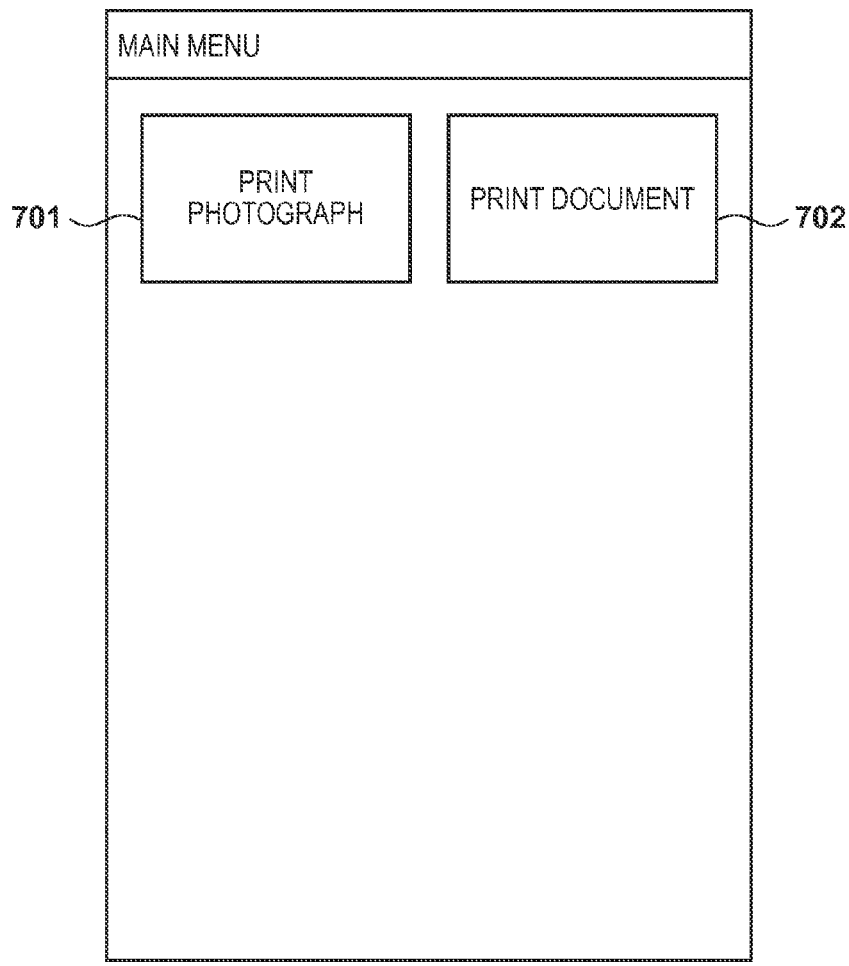
FIG. 7 is a diagram showing an application software activation screen.

FIG. 7 shows an activation screen for activating application software that runs on the terminal apparatus 200 according to the present embodiment. On the activation screen, a photograph printing screen transition button 701 and a document printing screen transition button 702 are disposed. In response to the user pressing either button, transition is performed to a screen for selecting an intended print target file (print target data).

Figure 8:
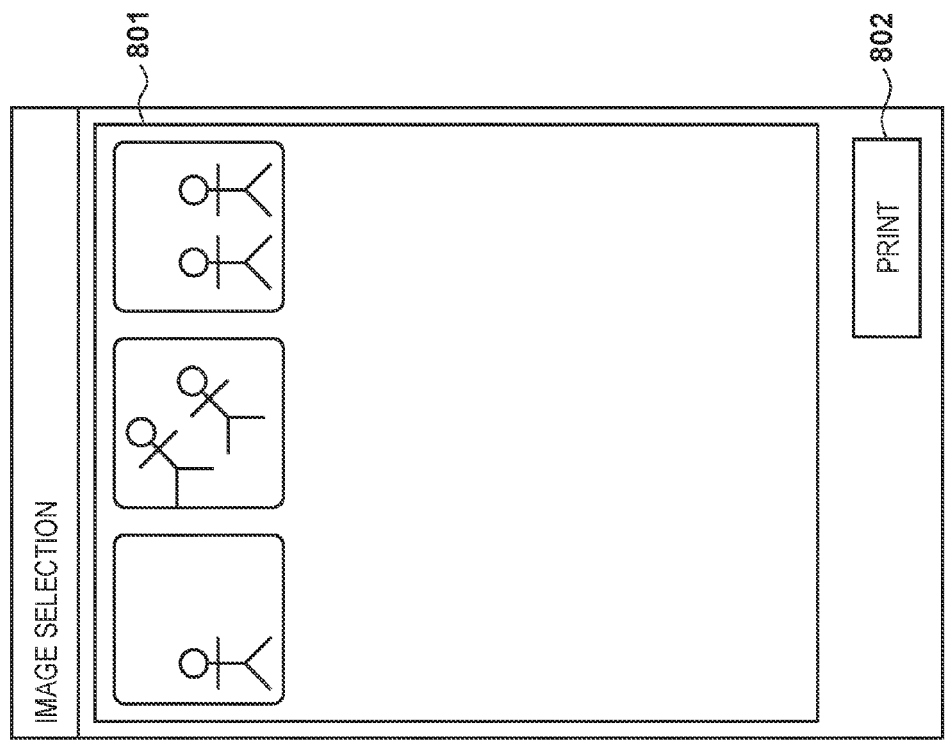
FIG. 8 is a diagram showing an image print screen.

FIG. 8 shows an image print screen to which transition is made in response to the photograph printing screen transition button 701 being pressed. On the screen, a list of thumbnails of image files stored in the image memory 220 is displayed. By the user selecting a desired image and pressing a print button 802, the selected image is printed.

Figure 9:
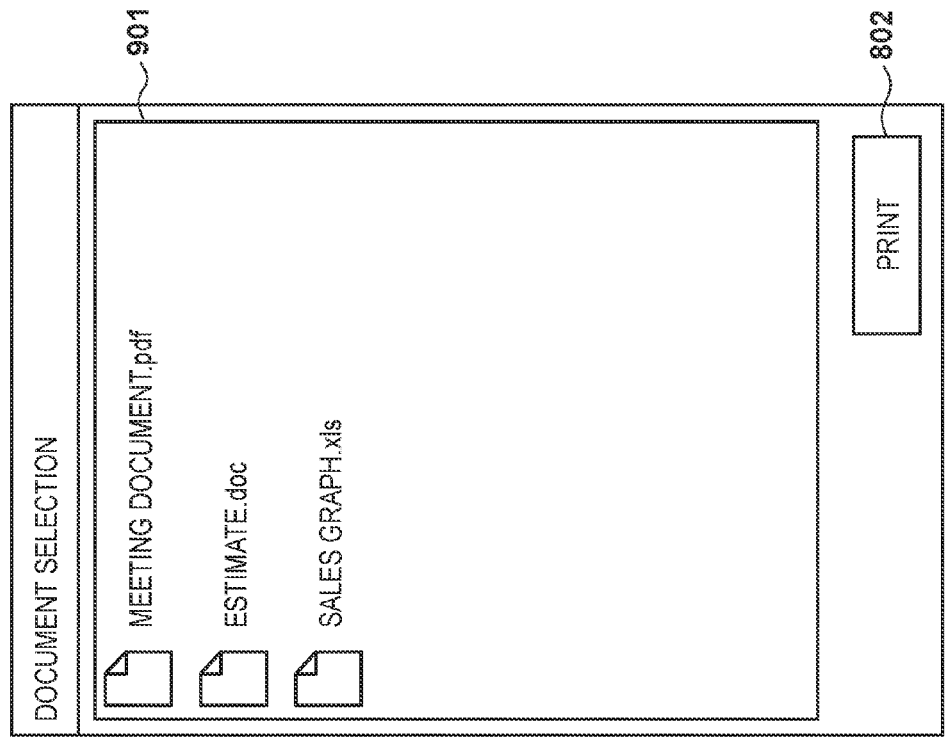
FIG. 9 is a diagram showing a document print screen.

FIG. 9 shows a document print screen to which transition is made in response to the document printing screen transition button 702 being pressed. In a document data display area 901, a list of document data files in the PDF (portable document format) format and the like stored in the data memory 214 is displayed. By the user selecting a desired data file and pressing the print button 802, the selected data is printed.

Alternatively, in a state in which a desired image or document data is selected on the image print screen or the document print screen, the terminal apparatus 200 is brought closer to the printing apparatus 300. To be specific, the terminal apparatus 200 is brought closer to the printing apparatus 300 until the distance between the NFC unit 201 of the terminal apparatus 200 and the NFC unit 306 of the printing apparatus 300 is less than or equal to a distance (about 10 cm) that allows NFC communication to be established therebetween. It may also be possible to print selected data through this operation. In this case, the application software according to the present embodiment performs printing without accepting any special print settings from the user, the details of which will be described later.

FIG. 10 is a diagram showing a print settings screen, and transition is made to this screen in response to the print button 802 being pressed on the image print screen or the document print screen. The print settings screen includes a thumbnail display area 1001 for displaying an image selected on the image print screen, and a printing apparatus name display area 1002 for displaying the name of the printing apparatus with which printing is to be performed. The screen shown in FIG. 10 further includes a sheet settings display area 1003 for displaying the current sheet settings such as the sheet size and the sheet type, a number-of-sets display area 1004 for displaying the number of sets, and a print button 1005. Nothing is displayed in the thumbnail display area 1001 if transition is made from the document print screen to this screen. For example, a case is assumed where the terminal apparatus 200 does not have a function of converting a document to image data that can be interpreted by the printing apparatus 300. Processing performed in this case will now be described. If a document is selected and thereafter the print button 802 is pressed on the screen shown in FIG. 9, the terminal apparatus 200 transmits the document to a server with which communication is possible. Then, the server converts the document to image data, and transmits the image data to the terminal apparatus. The terminal apparatus 200 displays the received image data as a preview image. If a print button is pressed on the screen displaying the preview image, the screen shown in FIG. 10 is displayed. However, the preview image of the print target document was already displayed, and thus the thumbnail image is not displayed on the screen shown in FIG. 10. However, it may also be possible to display the thumbnail image on the screen shown in FIG. 10. The printing apparatus with which printing is to be performed is set on another menu (not shown) of the application software. The sheet settings can be made by pressing the sheet settings display area 1003. The setting method will be described later. In the number-of-sets display area 1004, the number of sets can be set.

FIG. 11 is a diagram showing a sheet settings screen. This screen is a screen to which transition is made in response to the sheet settings display area 1003 being pressed. The sheet settings screen includes a sheet size display area 1101, a sheet type display area 1102, and a margin settings display area 1103. In response to the sheet size display area 1101 being pressed, a list 1201 listing selectable sheet sizes as shown in FIG. 12 is displayed, and thus the user can select a desired size from among the list. In response to the sheet type display area 1102 being pressed, a list 1301 listing selectable sheets as shown in FIG. 13 is displayed, and thus the user can select a desired sheet type from among the list. In the present embodiment, as shown in FIG. 13, "plain paper", "Photo Paper Plus Glossy II", "Photo Paper Plus Semi-gloss", "Glossy Photo Paper", "High Resolution Paper", "Photo Paper", "envelope" and "Hagaki" can be set.

Sheet Information Setting Values and Priority Print Conditions

Figures 14A, 14B, 15:
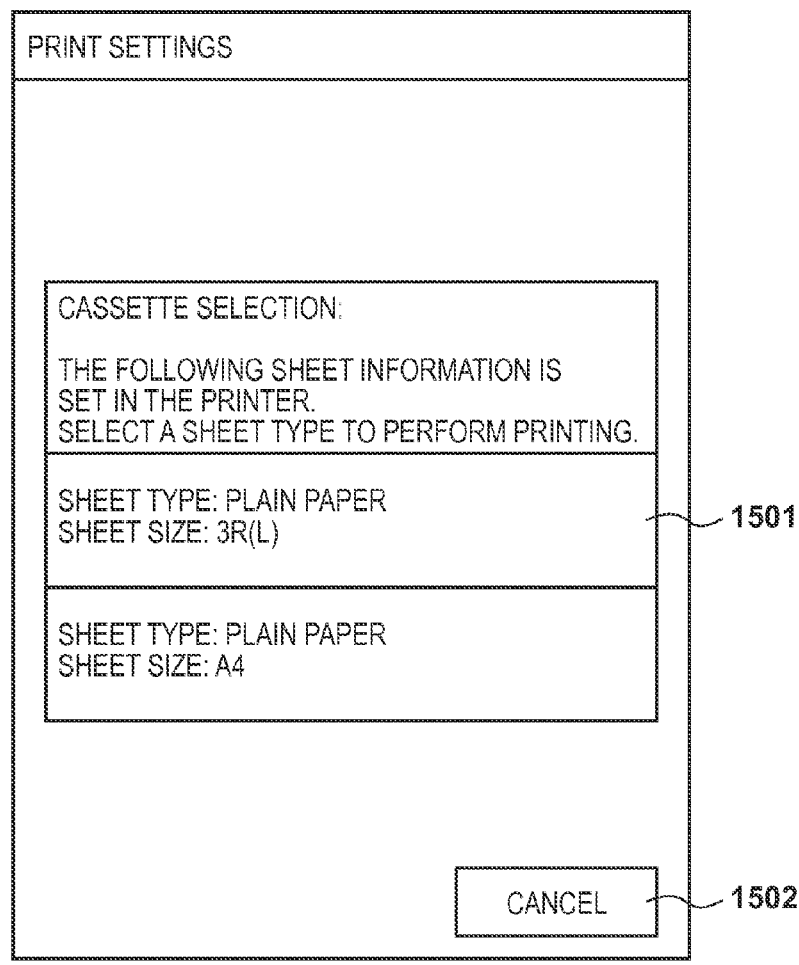
FIGS. 14A and 14B are diagrams showing examples of sheet information settings.
FIG. 15 is a diagram showing an example of a sheet information selection screen presented to a user.

FIG. 14A is a diagram showing examples of sheet information set in the printing apparatus 300 according to the present embodiment. The printing apparatus 300 includes two print paper feed trays 303a and 303b. With respect to paper feed tray 1 (the print paper feed tray 303a) shown in the diagram, "Photo Paper Plus Glossy II" is set as the sheet type (indicating the material and surface characteristics of the sheet), and "3R(L)" is set as the sheet size. Likewise, with respect to paper feed tray 2 (the print paper feed tray 303b) shown in the diagram, "plain paper" is set as the sheet type, and "A4" is set as the sheet size.

FIG. 14B shows other examples of sheet information set in the same. This diagram shows an example in which with respect to the paper feed tray 1, "plain paper" is set as the sheet type and "3R(L)" is set as the sheet size. The diagram also shows an example in which with respect to the paper feed tray 2, "plain paper" is set as the sheet type, and "A4" is set as the sheet size.

In order to simplify the description, it is assumed that the sheet information shown in FIG. 14A is set and registered in the printing apparatus 300 of the present embodiment.

On the other hand, it is assumed in the terminal apparatus 200, a setting has been made such that the sheets indicated by group 1 are used preferentially if the print target is a non-photographic image (a PDF file or the like). It is also assumed that a setting has been made such that the sheets indicated by group 2 are used preferentially if the print target is a photographic image. The sheet types belonging to the groups 1 and 2 are as follows:

group 1={"plain paper", "High Resolution Paper"}; and
group 2={"Photo Paper Plus Glossy II", "Photo Paper Plus Semi-gloss", "Glossy Photo Paper", "Photo Paper"}.

Note that "envelope" and "Hagaki" are not included in any of the groups.

Although the details will be described later, under the above-described conditions, the terminal apparatus 200 issues, to the printing apparatus 300, a request for information regarding the recording paper set in the paper feed trays 303a and 303b. As a result, the terminal apparatus 200 acquires the information shown in FIG. 14A from the printing apparatus 300. It is assumed here that a photographic image has already been selected by the terminal apparatus 200 as the print target. In the case of a photographic image, according to the above conditions, the group 2 is set as the recommended sheets, and thus the CPU 211 of the terminal apparatus 200 determines whether or not there is, in the group 2, a sheet type that matches the sheet types acquired from the printing apparatus 300. The group 2 includes "Photo Paper Plus Glossy II", which is set with respect to the paper feed tray 1 (the paper feed tray 303a) in FIG. 14A, and thus the CPU 211 determines the use of the paper feed tray 1 (the paper feed tray 303a) of the printing apparatus 300. Also, the CPU 211 determines image processing specialized for the sheet type, and at the same time also determines the magnification factor for the photographic image serving as the print target because the CPU 211 can acquire "3R(L)" as the print size. Then, the CPU 211 executes the determined processing on the print target image data so as to generate print data including a command for designating the paper feed tray 303a, and transmits the print data to the printing apparatus 300.

The foregoing has described an example in which a photographic image is selected as the print target. In the following, an example will be described in which a PDF file is selected. The PDF file is a non-photographic image file, and thus the sheets belonging to the group 1 are determined as the selection candidates. Among the information (FIG. 14A) acquired from the printing apparatus 300, "plain paper" matches one of the sheet types belonging to the group 1. Accordingly, the CPU 211 determines the use of the recording paper set in the paper feed tray 2 (the paper feed tray 303*b*). In this case, the CPU 211 can acquire "A4 size" as the size, and thus performs processing based on that size so as to generate print data including a command for designating the paper feed tray 2, and transmits the print data to the printing apparatus 300.

A situation may occur in which in the information acquired from the printing apparatus, there is no sheet type that matches any one of the sheet types defined by the priority groups. In this case, the sheet information is presented to the user. In other words, the sheet information regarding the sheets currently set in the printer is displayed.

Processing Flow

Hereinafter, a processing flow performed by the CPU 211 of the terminal apparatus 200 according to the present embodiment will be described with reference to the flowchart shown in FIG. 16. The flowchart of the terminal apparatus 200 according to the present invention is implemented by the CPU 211 reading a program related to this flowchart and executing the program.

With the terminal apparatus 200, the user activates an application on the screen shown in FIG. 7, selects a print target, and brings the terminal apparatus 200 closer to the printing apparatus 300 so that NFC communication is established with the printing apparatus 300 (hereinafter, the series of operations will be referred to as an "NFC touch operation"). As a result, the CPU 211 of the terminal apparatus 200 starts NFC communication with the NFC unit 306 of the printing apparatus 300 via the NFC unit 201. Upon establishment of the NFC communication, the CPU 211 acquires information stored in the non-volatile memory provided in the NFC unit 306 of the printing apparatus 300 (S1601). The information includes parameters (SSID, encryption scheme, encryption key and the like) for performing wireless communication with the printing apparatus 300, and information indicating that the printing apparatus 300 is capable of responding to a paper feed tray query command (information indicating that the printing apparatus 300 is capable of interpreting the command). However, in the case of a printing apparatus other than the printing apparatus 300 of the present embodiment, care should be taken because the latter information is not necessarily stored in the printing apparatus. In addition, after completion of acquisition of the information, it is unnecessary to maintain the NFC communication distance between the terminal apparatus 200 and the printing apparatus 300, and thus the user may move the terminal apparatus 200 away from the printing apparatus 300 and perform operations in a natural posture.

The CPU 211 sets parameters related to wireless LAN communication in the wireless LAN control circuit 215 according to the acquired information, and establishes communication with the printing apparatus 300 by using the wireless LAN unit 202 (S1602). Here, the information is acquired from the printing apparatus 300 through NFC communication, but it is also possible to use a configuration in which necessary information is acquired by using an interface such as the Bluetooth® or the Bluetooth® Low Energy.

Next, in S1603, the CPU 211 analyzes the information acquired from the printing apparatus 300 in a preceding step, namely, S1601, and determines whether or not the printing apparatus 300 is capable of interpreting the paper feed tray query command (S1603). If it is determined that the printing apparatus 300 is not capable of interpreting the command, the terminal apparatus 200 cannot acquire the sheet type and size of the sheets set in the printing apparatus 300. Accordingly, the procedure proceeds to S1604, where a sheet settings screen is displayed. Then, the CPU 211 prompts the user to make sheet settings, confirm the setting values set on the print settings screen, and then press the print button. Upon detection of this pressing operation, the CPU 211 reflects the setting values in the print settings (S1605), generates print data based on the settings information, and performs transmission processing using a wireless LAN (S1614). For example, the terminal apparatus 200 generates print data including the settings information and image data.

If, on the other hand, it is determined that the printing apparatus 300 is capable of interpreting the paper feed tray query command, the procedure proceeds to step S1606, where the CPU 211 transmits the paper feed tray query command to the printing apparatus 300 through the wireless LAN communication. As a result, the printing apparatus 300 returns information indicating the sheet type and size of the sheets set in the paper feed trays 303*a* and 303*b* of the printing apparatus 300 (in the present embodiment, the information shown in FIG. 14A), and the terminal apparatus 200 receives the information through the wireless LAN communication.

Next, the CPU 211 discriminates whether an attribute of the data selected by the user as the print target indicates a photographic file or a non-photographic file (a document file such as a PDF file) (S1607). In the present embodiment, the discrimination is made by determining whether the user pressed the photograph printing screen transition button 701 or the document printing screen transition button 702 on the application software activation screen. A configuration is also possible in which the application accepts a selection of target data to be printed and discriminates the attribute of the selected data file based on the identifier of the file.

If the print target is determined as photograph, the CPU 211 sets "group 2" as the priority sheet setting (S1608). As described above, "group 2" includes "Photo Paper Plus Glossy II", "Photo Paper Plus Semi-gloss", "Glossy Photo Paper", and "Photo Paper". If, on the other hand, the print target is determined as non-photograph, or in other words, as document, the CPU 211 sets "group 1" as the priority sheet setting (S1609). As described above, "group 1" includes "plain paper" and "High Resolution Paper". Through the processing performed in step S1608 or S1609, the sheet type (sheet attribute) corresponding to the selected print target data is determined.

In S1610, the CPU 211 judges whether the paper feed tray information acquired in S1606 includes a sheet type that matches any one of the sheet types belonging to the group determined in step S1608 or S1609. If it is judged that the paper feed tray information includes a sheet type that matches any one of the sheet types belonging to the determined group, the CPU 211 sets information in the print settings according to the paper feed tray in which the sheet type is registered and the type and size of the sheet (S1613). If, on the other hand, it is judged that the paper feed tray information does not include a sheet type that matches any one of the sheet types belonging to the determined group, the CPU 211 presents the sheet information acquired in S1606 to the user in a selectable manner (S1611).

FIG. 15 shows a screen displayed when, for example, "plain paper" is set in both the paper feed trays 303*a* and 303*b* of the printing apparatus 300, "3R(L)" is set in one of the paper feed trays 303*a* and 303*b*, "A4 size" is set in the other paper feed tray, and the user selects to print a photograph. In this case, "plain paper" is not registered in the group 2, and thus the screen shown in FIG. 15 is displayed. In response to the user selecting desired sheet information from among the displayed selectable sheets, the CPU 211 sets print settings information according to the selected paper feed tray and the sheet size (S1612). If there is no desired selection candidate, the user may cancel the printing operation by pressing a cancel button 1502.

Finally, in S1614, print data generation processing (including magnification processing) is performed based on the print settings information set in any one of the steps S1605, S1612 and S1613 and the print target file (print target data). If the sheet information includes the sheet type (sheet attribute) selected in S1608 or S1609, print data for printing the print target data onto a sheet corresponding to the sheet attribute selected in S1608 or S1609 is generated in S1614. Then, the CPU 211 transmits the generated print data (including a paper feed tray designating command) to the printing apparatus 300 through the wireless LAN communication.

As described above, according to the first embodiment, the user of the terminal apparatus 200 performs operations of selecting a print target data (file) and bringing the terminal apparatus 200 within the NFC communication range of the printing apparatus 300. Then, after the operations, the selected data is printed onto a print sheet suitable for the selected data (file) without requiring a special print setting operation to be performed.

In the first embodiment, an example was described in which the terminal apparatus 200 acquires, through wireless LAN communication, information indicating whether or not the printing apparatus 300 has the ability of responding to the paper feed tray query. However, as long as the non-volatile memory provided in the NFC unit 306 of the printing apparatus 300 has a capacity sufficient to store sheet information, the sheet information may be acquired through NFC communication established first between the NFC units. In addition, the number of paper feed trays is not limited to two, and may be three or more.

Figure 16:
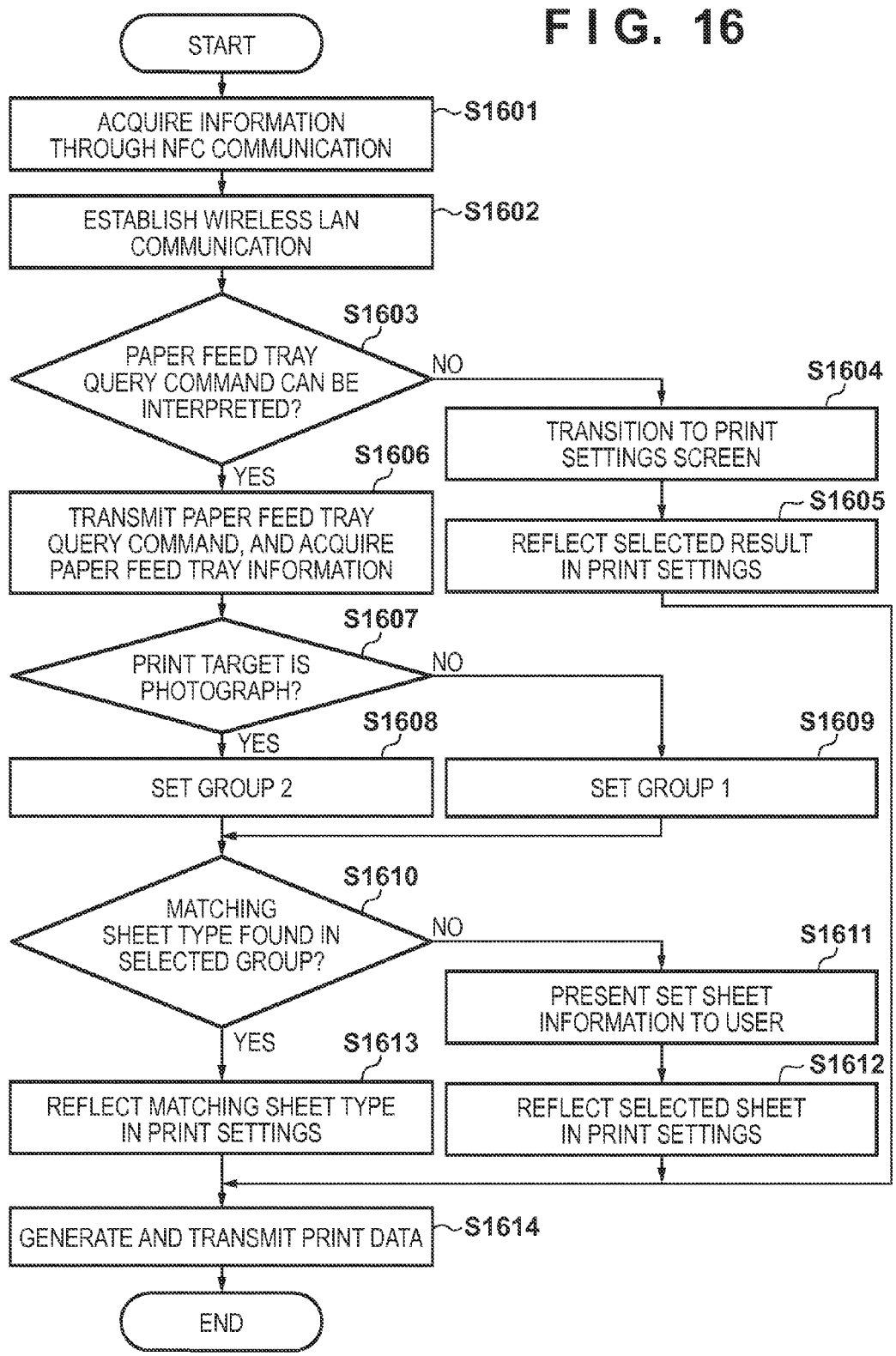
FIG. 16 is a flowchart illustrating a procedure of processing according to a first embodiment.

Also, in FIG. 16, the determination in S1603 is made by using the information acquired through NFC communication, but the processing may be performed without using NFC communication. For example, a configuration is possible in which the user selects an access point on the screen of the terminal apparatus 200, and then selects a printing apparatus the user wants to use to perform printing from among a list of printing apparatuses connected to the selected access point. Then, the terminal apparatus 200 acquires print function information from the selected printing apparatus via the access point. The terminal apparatus 200 may judge, based on the acquired print function information, whether or not the printing apparatus can interpret the paper feed tray query command. In the case where the print function information includes sheet information, the terminal apparatus 200 may execute step S1607 after step S1603, without performing step S1606.

Furthermore, in the present embodiment, an example was described in which the sheet information includes both the sheet type and the sheet size, but it is sufficient that at least the sheet type is included in the sheet information.

Second Embodiment

Figure 17:
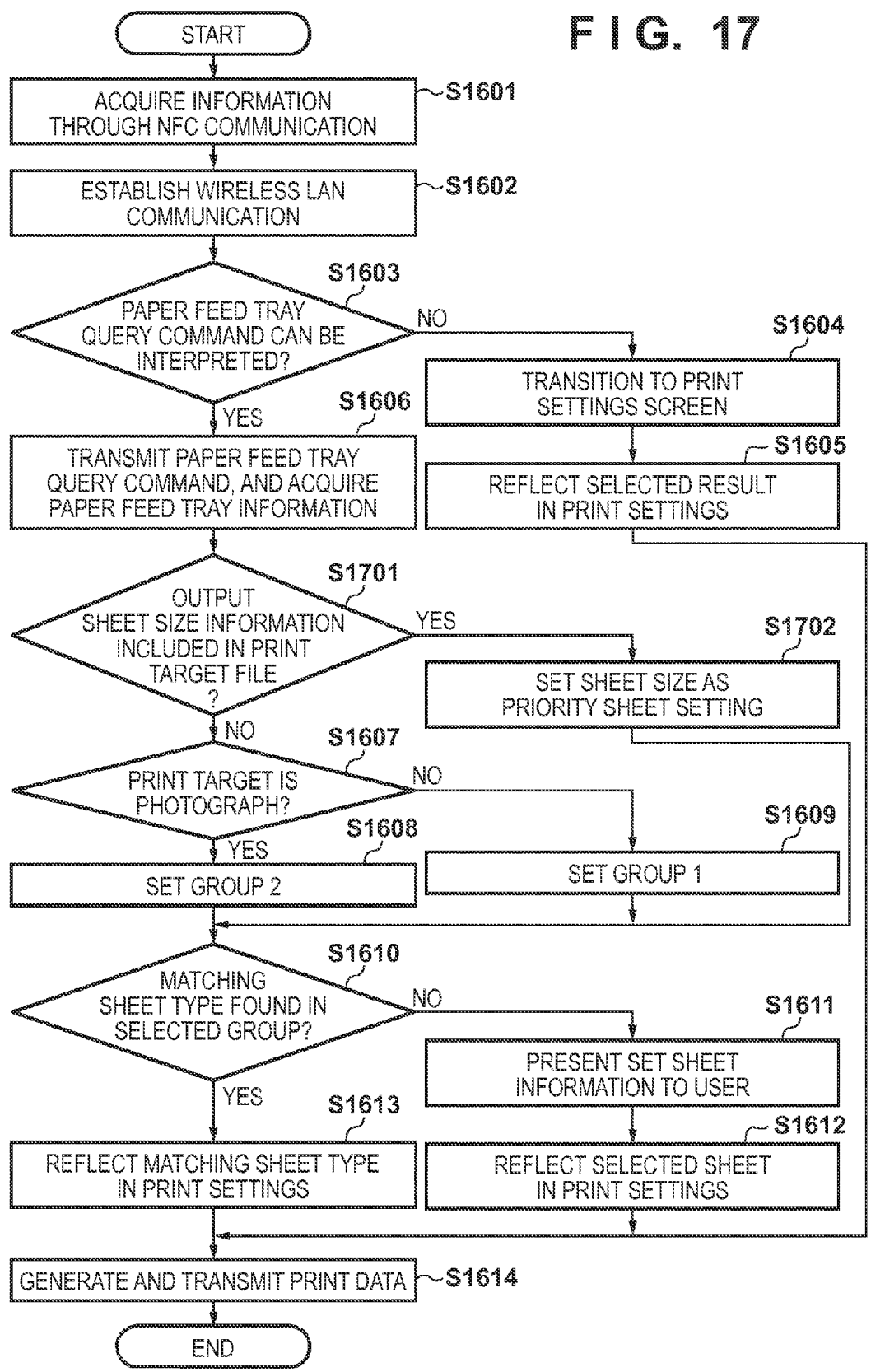
FIG. 17 is a flowchart illustrating a procedure of processing according to a second embodiment.

A processing flow according to a second embodiment of the present invention is shown in FIG. 17. The processing flow shown in the diagram is the same as that of the first embodiment except that steps S1701 and S1702 are added. Accordingly, only the difference from the first embodiment will be described here.

In S1701, it is judged whether or not the print target file includes information indicating output sheet size (output sheet size information) (this judging processing is also referred to as "size judgment"). If it is judged that the print target file does not include the output sheet size information, the procedure proceeds to S1607. If, on the other hand, it is judged that the print target file includes the output sheet size information, the procedure proceeds to S1702, where "the output sheet size included in the print target" is set as the priority print setting.

In the first embodiment described above, the sheet type is set as the priority print setting, and groups are set as the setting values. In the second embodiment, the sheet size is set as a priority print setting, and as an additional setting value, a specific sheet size (here, the output sheet size included in the print target) is set. In S1610, it is confirmed whether there is sheet information corresponding to the priority print setting set in S1702.

Third Embodiment

A third embodiment will be described by way of an example in which print data more suitable for the print target is transmitted to the printing apparatus 300. Generally speaking, if the print target is photographic data, it is desirable to transmit lossy compression data having a balance between good image quality and data size, and if the print target is a document, it is desirable to transmit lossless compression data that does not cause an image degradation. Accordingly, in the third embodiment, processing for generating print data in a compression scheme corresponding to the attribute of print target data will be described.

A processing flow according to the third embodiment is shown in FIG. 18. The processing flow shown in the diagram is the same as that of the first embodiment except that steps S1608 and S1609 are respectively replaced by steps S1801 and S1802 and that the processing performed in S1614 is partially changed. Accordingly, only the differences from the first embodiment will be described here.

If it is determined in S1607 that the print target is a photograph, the CPU 211 sets "group 2" as the priority sheet setting, and sets information indicating lossy compression data in a storage area (not shown) for storing the type of print data generated by print data generation processing (S1801). If it is determined that the print target is a document, the CPU 211 sets "group 1" as the priority sheet setting, and sets information indicating lossless compression data in the storage area for storing the type of print data generated by print processing in S1614 (S1802). With the print data generation processing, data to be transmitted to the printing apparatus 300 is generated according to the information regarding the type of print data set in steps S1801 and S1802, and then transmitted to the printing apparatus 300. To be specific, in the case where information indicating lossy compression data is set, JPEG data is generated by the print data generation processing. In the case where information indicating lossless compression data is set, PWG Raster data is generated by the print data generation processing. In the case where information indicating lossless compression data is set and the target data is composed only of black data, 1 bit Tiff data may be generated in consideration of the amount of data. The JPEG data and the PWG Raster data are merely examples, and thus data in any other format may be generated.

Other Embodiments

In the present invention, the group 1 or 2 is determined with reference to the sheet type, and the processing in step S1610 is performed by using the sheet type, but the sheet size may be used instead of the sheet type. In this case, it is sufficient that the sheet information acquired from the printing apparatus 300 includes at least information regarding the sheet size. In the case where the processing in step S1610 is performed by using the sheet size, the sheet size is used as the sheet attribute. It is also possible to use both the sheet type and the sheet size. In the case where the processing in step S1610 is performed by using both the sheet type and the sheet size, the sheet type and the sheet size are used as the sheet attribute.

Also, in the present invention, FIGS. 16 and 17 were described as the processing performed by the terminal apparatus 200, but FIGS. 16 and 17 may be executed as the processing performed by an application that runs on the terminal apparatus 200.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136218, filed Jul. 1, 2014 and Japanese Patent Application No. 2015-028861, filed Feb. 17, 2015, which are hereby incorporated by reference herein in their entirety.

What is claimed is:

1. An information processing apparatus having a first wireless communication unit and a second wireless communication unit which is capable of performing higher speed communication than the first wireless communication unit, the information processing apparatus comprising:
an acquisition unit configured to acquire communication information from an image forming apparatus using the first wireless communication unit, wherein the image forming apparatus prints using a sheet in a feed tray of the image forming apparatus;
a determination unit configured to determine a sheet attribute that is used to perform printing based on an attribute of print;
a communication control unit configured to cause the second wireless communication unit to establish communication with the image forming apparatus using the acquired communication information; and
a transmission unit configured to transmit print target data to the image forming apparatus via the established communication,
wherein sheet information for the feed tray is stored in the image forming apparatus,
wherein, if the sheet attribute determined by the determination unit corresponds to the sheet information for the feed tray stored in the image forming apparatus, printing is performed, and
wherein if the sheet attribute determined by the determination unit does not correspond to the sheet information for the feed tray stored in the image forming apparatus, the sheet information for the feed tray being stored in the image forming apparatus and an option corresponding to a print cancellation are displayed in a display area, and then processing based on an instruction input via the display area is performed.

2. The apparatus according to claim 1, further comprising a variable magnification unit configured to change a magnification of the print target data based on a sheet size set for a determined feed tray.

3. The apparatus according to claim 1, wherein the attribute of the print is selected from options including a photo printing and a document printing.

4. The apparatus according to claim 1, further comprising a judgement unit configured to judge whether the attribute of print is a photographic attribute or a non-photographic attribute based on an option selected from a photo printing and a document printing.

5. The apparatus according to claim 1, further comprising:
a discrimination unit configured to discriminate whether or not the image forming apparatus has a function of transmitting the information in response to a request from the acquisition unit; and
a display unit configured to, if a result of the discrimination by the discrimination unit indicates that the image forming apparatus does not have the function, display a sheet information settings screen for making print settings.

6. The apparatus according to claim 1, wherein the sheet attribute is sheet type or sheet size, and the sheet information includes sheet type information or sheet size information.

7. A control method for controlling an information processing apparatus having a first wireless communication unit and a second wireless communication unit which is capable of performing higher speed communication than the first wireless communication unit, the method comprising:
acquiring communication information from an image forming apparatus using the first wireless communication unit, wherein the image forming apparatus prints using a sheet in a feed tray of the image forming apparatus;
determining a sheet attribute that is used to perform printing based on an attribute of print;
causing the second wireless communication unit to establish communication with the image forming apparatus using the acquired communication information; and
transmitting print target data to the image forming apparatus via the established communication,
wherein sheet information for the feed tray is stored in the image forming apparatus,
wherein, if the determined sheet attribute corresponds to the sheet information for the feed tray stored in the image forming apparatus, printing is performed, and wherein, if the determined sheet attribute does not correspond to the sheet information for the feed tray stored in the image forming apparatus, the sheet information for the feed tray being stored in the image forming apparatus and an option corresponding to a print cancellation are displayed in a display area, and then processing based on an instruction input via the display area is performed.

8. The method according to claim 7, further comprising changing a magnification of the print target data based on a sheet size set for a determined feed tray.

9. The method according to claim 7, wherein the attribute of the print is selected from options including a photo printing and document printing.

10. The method according to claim 7, further comprising judging whether the attribute of print is a photographic attribute or a non-photographic attribute based on an option selected from a photo printing and a document printing.

11. The method according to claim 7, further comprising:
discriminating whether or not the image forming apparatus has a function of transmitting the information in response to a request made in the acquiring; and
displaying, if a result of the discrimination indicates that the image forming apparatus does not have the function, displaying a sheet information settings screen for making print settings.

12. The method according to claim 7, wherein the sheet attribute is sheet type or sheet size, and the sheet information includes sheet type information or sheet size information.

13. A non-transitory computer-readable storage medium storing a program executed by a processor in an information processing apparatus having a first wireless communication unit and a second wireless communication unit capable of performing higher speed communication than the first wireless communication unit, the program comprising:
code for acquiring communication information from an image forming apparatus using the first wireless communication unit, wherein the image forming apparatus prints using a sheet in a feed tray of the image forming apparatus;
code for determining a sheet attribute that is used to perform printing based on an attribute of print;
code for causing the second wireless communication unit to establish communication with the image forming apparatus using the acquired communication information; and
code for transmitting print target data to the image forming apparatus via the established communication,
wherein sheet information for the feed tray is stored in the image forming apparatus,
wherein, if the determined sheet attribute corresponds to the sheet information for the feed tray stored in the image forming apparatus, printing is performed, and
wherein, if the determined sheet attribute does not correspond to the sheet information for the feed tray stored in the image forming apparatus, the sheet information for the feed tray being stored in the image forming apparatus and an option corresponding to a print cancellation are displayed in a display area, and then processing based on an instruction input via the display area is performed.

14. The apparatus according to claim 1, wherein the first wireless communication unit is a near field communication unit (NFC) and the second wireless communication unit is a wireless LAN unit.

15. The apparatus according to claim 1, wherein the first wireless communication unit is a Bluetooth unit and the second wireless communication unit is a wireless LAN unit.

16. The apparatus according to claim 1, wherein the sheet information for the feed tray is stored in the image forming apparatus by an instruction from a user.

17. The apparatus according to claim 1, wherein if the sheet attribute determined by the determination unit corresponds to the sheet information for the feed tray stored in the image forming apparatus, printing is performed using a sheet corresponding to the determined sheet attribute.

18. The method according to claim 7, wherein the first wireless communication unit is a near field communication (NFC) unit and the second wireless communication unit is a wireless LAN unit.

19. The method according to claim 7, wherein the first wireless communication unit is a Bluetooth unit and the second wireless communication unit is a wireless LAN unit.

20. The method according to claim 7, wherein the sheet information for the feed tray is stored in the image forming apparatus by an instruction from a user.

21. The method according to claim 7, wherein if the determined sheet attribute corresponds to the sheet information for the feed tray stored in the image forming apparatus, printing is performed using a sheet corresponding to the determined sheet attribute.

22. A control method for controlling an information processing apparatus having a first wireless communication unit and a second wireless communication unit which is capable of performing higher speed communication than the first communication unit, the method comprising:
acquiring communication information from an image forming apparatus using the first wireless communication unit, wherein the image forming apparatus prints using a sheet in a feed tray of the image forming apparatus;
determining a sheet attribute that is used to perform printing based on an attribute of print;
causing the second wireless communication unit to establish communication with the image forming apparatus using the acquired communication information; and
transmitting print target data to the image forming apparatus via the established communication,
wherein sheet information for the feed tray is registered in the image forming apparatus,
wherein if the determined sheet attribute is registered in the image forming apparatus, printing is performed, and
wherein if the determined sheet attribute is not registered in the image forming apparatus, an option group including a first option to print using a sheet corresponding the sheet information being registered in the image forming apparatus and a second option corresponding to a print cancellation is displayed in a display area, and then processing based on an option selected from the option group is performed.

23. The method according to claim 22, wherein the first wireless communication unit is a near field communication (NFC) unit and the second wireless communication unit is a wireless LAN unit.

24. The method according to claim 22, wherein the first wireless communication unit is a Bluetooth unit and the second wireless communication unit is a wireless LAN unit.

25. The method according to claim 22, wherein the sheet information for the feed tray is registered in the image forming apparatus by an instruction from a user.

26. The method according to claim 22, wherein if the sheet information corresponding to the determined sheet attribute is registered in the image forming apparatus, printing is performed using a sheet corresponding to the determined sheet attribute.

* * * * *